United States Patent [19]

Frano et al.

[11] Patent Number: 4,580,859
[45] Date of Patent: Apr. 8, 1986

[54] LIGHT-EMITTING DIODE HOLDER ASSEMBLY

[75] Inventors: Francis G. Frano, Hoffman Estates; John N. Schavilje, Mt. Prospect; George J. Bury, Lake Villa, all of Ill.

[73] Assignee: Illinois Tool Works Inc., Chicago, Ill.

[21] Appl. No.: 684,310

[22] Filed: Dec. 20, 1984

[51] Int. Cl.⁴ .............................................. H01R 13/62
[52] U.S. Cl. ............................ 339/91 R; 339/126 RS; 339/128; 339/147 R
[58] Field of Search ............... 339/147 R, 147 P, 126, 339/128, 91 R, 125 R

[56] References Cited

U.S. PATENT DOCUMENTS

| 3,179,738 | 4/1965 | de Lyon | 339/126 RS |
| 3,213,189 | 10/1965 | Mitchell et al. | 339/128 |
| 3,523,269 | 8/1970 | Witek | 339/128 |
| 3,573,716 | 4/1971 | Garver | 339/128 |
| 3,989,343 | 11/1976 | Lucius et al. | 339/128 |
| 4,453,195 | 6/1984 | Sauer et al. | 339/128 |
| 4,526,431 | 7/1985 | Kasukawa | 339/91 R |

FOREIGN PATENT DOCUMENTS 6609509 1/1967 Netherlands ............... 339/128

Primary Examiner—Gil Weidenfeld
Assistant Examiner—David L. Pirlot
Attorney, Agent, or Firm—J. P. O'Brien; T. W. Buckman

[57] ABSTRACT

A holder made of resilient plastic material is disclosed for mounting a light-emitting diode having a rectangular-shaped base into a rectangular-shaped aperture of a panel member. The holder has a rectangular-shaped hollow body of a cross section slightly smaller than the rectangular-shaped aperture in the panel and is molded with a rectangular-shaped lengthwise throughbore for receiving a rectangular-shaped light-emitting diode. The rectangular-shaped body is molded into a first pair of opposing sidewalls and a second pair of opposing sidewalls. A pair of spaced lengthwise elongate slots are formed in the second pair to define a flexible central web portion in each sidewall of the second pair. The LED holder is retained in the rectangular-shaped aperture between an outwardly extending flange portion formed around the periphery of the upper end of the body, and a pair of resilient arm means formed on the outside surface of the first pair of opposite sidewalls, which provide a snapping engagement with the lower surface of the apertured panel. Crush rib means are formed on the outside surface of the web portions in a lengthwise direction to provide a wedging action between the LED holder and the apertured panel when the LED is inserted into the LED holder. A pair of shoulder latching means integrally formed on the inside surface of the web portions provide the means for engaging and holding the bottom edge surface of a rectangular-shaped base of a light-emitting diode.

4 Claims, 6 Drawing Figures

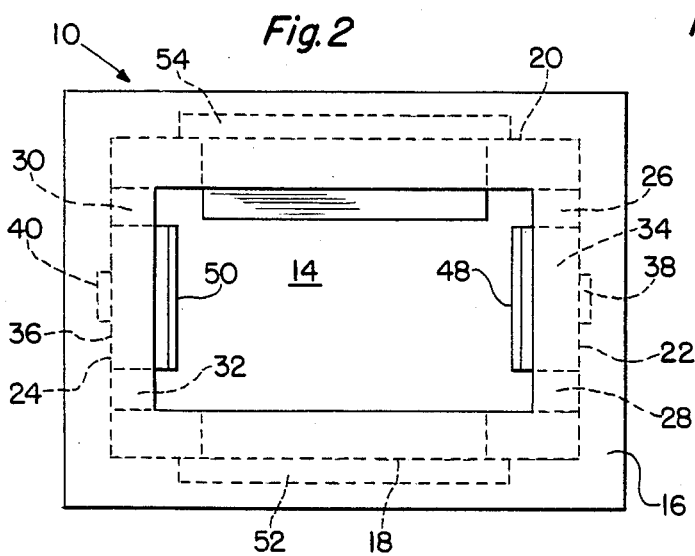
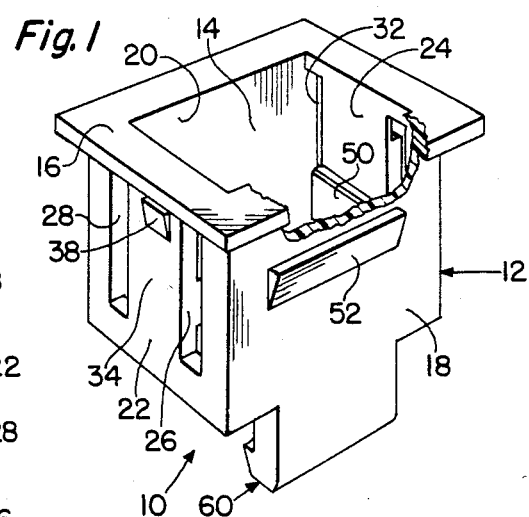
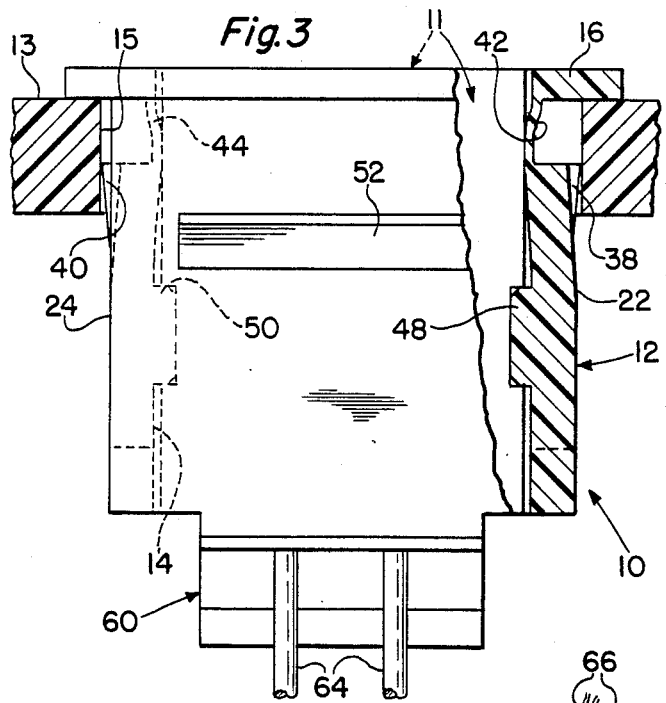
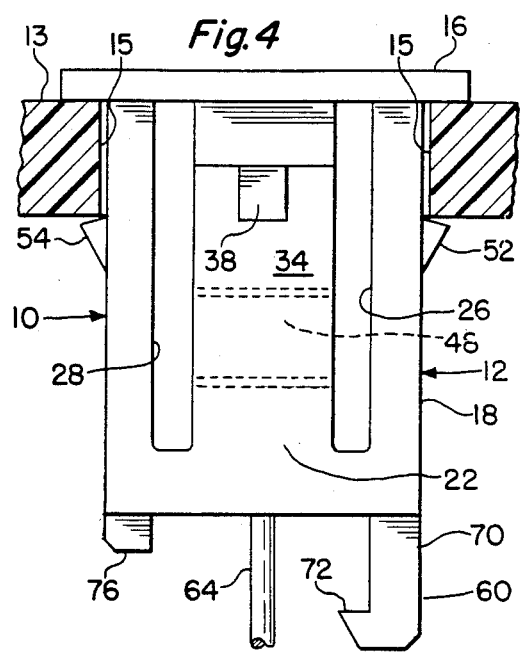
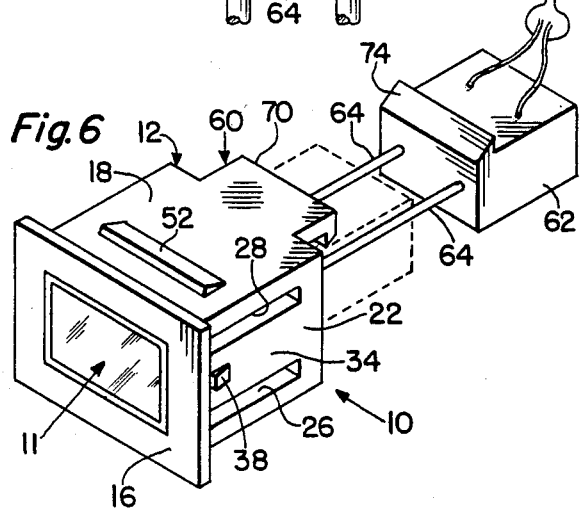
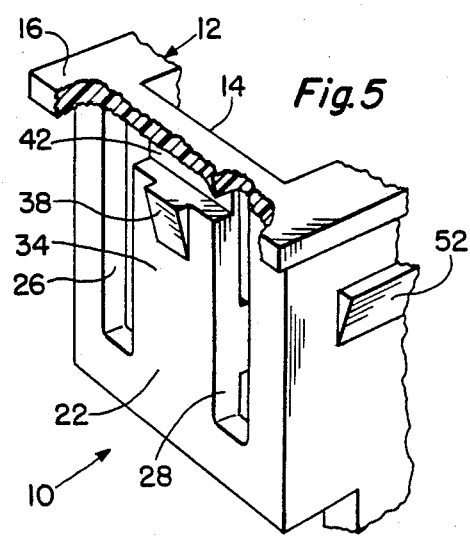

LIGHT-EMITTING DIODE HOLDER ASSEMBLY

BACKGROUND OF THE INVENTION

This invention is directed to a light-emitting diode holder and in particular, to a light-emitting diode holder molded of a plastic material.

This invention was derived from a need for a light-emitting diode holder that is easy to assemble into an apertured panel and which will hold the light-emitting diode rigidly within the panel once installed.

Because light-emitting diodes are of relatively small dimensions, it is difficult to make a LED holder of plastic material with sufficient structural integrity to rigidly hold the LED into an apertured panel. This invention accomplishes that design objective by causing the retaining sidewall means of the LED holder to be held in a tight interfitting relationship between the LED and the walls formed by the aperture in the panel.

The above-stated objective is accomplished by an LED holder having a regular-shaped hollow body with a central opening extending along the axis of the body. Two pairs of axially extending spaced elongate slots are formed through the side wall of the hollow body to define a flexible axially extending web portion on diametrically opposite sides of the hollow body. An outwardly extending flange portion is integrally formed around the periphery of the upper end of the regular-shaped body and coacts with a pair of resilient arm means formed on the outside surface of the body at a distance below the flange portion for providing a snapping engagement into the apertured panel. A pair of crush rib means integrally formed on the outside surface of the two flexible web portions provide a tight interfitting engagement between the LED and the apertured panel. A pair of shoulder latching means are integrally formed on the inside surface of the web portions for engaging and holding the bottom edge surface of the light-emitting diode when inserted into the apertured panel.

DESCRIPTION OF THE DRAWINGS

For a better understanding of this invention, reference may be made to the accompanying drawings, in which:

FIG. 1 is a perspective view illustrating the preferred embodiment of the invention;

FIG. 2 is a top elevational view of the preferred embodiment of FIG. 1;

FIG. 3 is a partial cross-sectional view depicting the preferred embodiment installed into an apertured panel and an LED installed in the holder;

FIG. 4 depicts the preferred embodiment installed in an apertured panel from a 90° orientation relative to the FIG. 3 depiction;

FIG. 5 is a partial perspective view similar to FIG. 1 illustrating the flexible web portion formed on one sidewall; and FIG. 6 is a perspective view of an LED installed in the preferred embodiment and an LED connector being mounted onto the LED's leads.

DESCRIPTION OF PREFERRED EMBODIMENT

Referring to FIG. 1, there is shown a light-emitting diode holder, illustrating the general principles of this invention and generally designated by the reference numeral 10. The holder 10 is illustrated in FIG. 3 as accommodating a light-emitting diode 11 having a rectangular-shaped base. The holder 10 forming the subject matter of the present invention is molded of a resilient plastic material of suitable qualities and color and is formed as a rectangular-shaped hollow body 12. The rectangular-shaped body 12 has a central opening 14 which extends lengthwise of the body and has a rectangular cross section to receive a rectangular-shaped LED base of a size slightly smaller than the opening's cross-sectional dimension.

The LED holder 10 has an integrally connected flange portion 16 connected to the upper peripheral surface of hollow body 12. Flange 16 extends outwardly beyond the body 12 around its entire peripheral area to provide a retention collar as will be explained hereinafter.

A first pair of opposing sidewalls 18 and 20 are formed as solid wall surfaces for the entire length of the body 12. The second pair of opposing sidewalls 22 and 24 are each formed with a pair of spaced elongate slots extending lengthwise of body 12. The pair of spaced elongate slots 26 and 28 for sidewall 22 extend from flange 16 and terminate a short distance from the lower end of body 12. Likewise, a pair of spaced elongate slots 30 and 32 are formed through sidewall 24.

The pair of slots 26 and 28 in sidewall 22 and the pair of slots 30 and 32 in sidewall 24 define flexible web portions 34 and 36, respectively.

There is formed on the outside surface of each flexible web portions 34 and 36 a crush rib segment 38 and 40, respectively. Both of these crush ribs are located a distance less than the thickness of the apertured panel in order to form a wedging relationship within the aperture of the panel as depicted in FIG. 3. Crush segments 38 and 40 have a decreasing tapered thickness away from the flange portion 16.

To permit the square base LED 11 to be inserted into the LED holder after it is mounted in the apertured panel 13, it was then necessary to form the uppermost web segments 42 and 44 of flexible web portions 34 and 36, respectively, of a substantially reduced wall thickness. The wall thickness for segments 42 and 44 is of the order of one-third the thickness of the remaining wall thickness for flexible web portions 34 and 36.

On the inside wall surface of the flexible web portions 34 and 36 there is formed a pair of shoulder latching means 48 and 50, respectively. Latching shoulder means 48 and 50 extend the width of the flexible web portions and are located so that a standard size square based LED can be installed flush relative to the flange portion 16, as depicted in FIG. 3.

To fasten the LED holder 12 into an apertured panel 13 there is provided a pair of resilient arm means 52 and 54 formed on the outer surface of sidewalls 18 and 20 respectively. These resilient arm means are located at a distance from flange 16 slightly less than the thickness of the apertured panel to provide a snap fitting engagement into the apertured panel. The resilient arm means 52 and 54 have a length extending substantially across the width of sidewalls 18 and 20, respectively, to prevent any rocking of the LED holder in the apertured panel.

As an optional feature, LED holder 12 includes a latching means 60 for retaining a standard female receptacle 62 which electrically connects the leads 64 of the LED 11 to the flexible leads 66 of connector 62. Latching means 60 comprises a downwardly extending leg portion 70 and a perpendicular latching shoulder 72 which snaps over the cam surface 74 of connector 62. Edge 76 extends downwardly from the bottom of the LED body 12 and engages the side surface of female receptacle 62 opposite to cam surface 74 to prevent any lateral shifting of the female receptacle 62.

From the foregoing description it will be appeciated that the LED holder 10 can be readily installed in a complementary aperture 15 of a panel 13. The LED holder is inserted through the aperture 15 in the manner depicted in FIG. 3. As the bottom surface of flange 16 strikes the upper surface of panel 13, the pair of latching arm means 52 and 54 snap into engagement with the bottom surface of the panel as depicted in FIG. 4.

A square based LED 11 is then inserted into opening 14 and the LED base comes into direct contact with the pair of upper thin wall segments 42 and 44. As it is pushed further into the opening 14, the slight space between the LED base and the sidewalls of aperture 15 cause the thin wall segments to stretch and simultaneously crushes the ribs 38 and 40 against the aperture wall surfaces as illustrated in FIG. 3. This provides a very tight interfitting relationship to prevent any rocking of the LED and the holder.

The insertion of the LED into the holder causes the mid-length section of the flexible web portions 34 and 36 to bow outwardly due to the interaction of the latching arm means 48 and 50 and the base of the LED. When the pair of lateral recesses formed in a standard square-base LEDs align with the latching shoulder means 48 and 50, the shoulder means 48 and 50 snap into the LED's recesses to latch the LED in place as depicted in FIG. 3.

The LED holder 12 is provided with the latch 60 to retain a standard connector or female receptacle 62. The standard female receptacle is threaded along the leads 64 until the camming shoulder 74 latches on the latching shoulder 72.

I claim:

1. A holder of resilient plastic material for mounting a light-emitting diode in an apertured panel having a rectangular aperture defined by four sidewalls formed through the thickness dimension of said panel, comprising a regular-shaped hollow body having a central opening extending along the axis of said body, two pairs of axially extending, spaced elongate slots formed through the sidewall of said hollow body to define two axially extending flexible web portions therebetween, said web portions being disposed diametrically opposite to each other relative to the axis of said regular-shaped body, an outwardly extending flange portion integrally connected around the periphery of the upper end of said body, a pair of resilient arm means formed on the outside surface of said body and disposed diametrically opposite relative to said axis, each of said arm means located at a distance below said flange portion for snapping into engagement with the lower surface of said apertured panel, resilient rib means integrally formed on the outside surface of each said web portions and extending axially adjacent to said flange portion for wedging said web portions into tight interfitting engagement with two opposing sidewalls of said four sidewalls of said rectangular aperture, and a shoulder latching means integrally formed on the inside surface of each of said web portions for engaging and holding the bottom edge surface of the base of a light-emitting diode.

2. A holder as defined in claim 1, wherein said shoulder latching means comprises an integrally formed abutment on said inside surface of each of said web portions, each of said abutments having a radially extending latching sholder with respect to said axis, each of said latching shoulders being in radial alignment with the other latching shoulder.

3. A holder as defined in claim 1, wherein each of said resilient rib means comprises a resilient elongate wedge integrally formed on said outside surface of one of said web portions and having a gradually decreasing thickness away from said flange portion.

4. A holder as defined in claim 1, further comprising latching arm means extending from the bottom of said body for holding a female receptacle member adapted to electrically connect the electrical leads of a light-emitting diode to a pair of electrical contact.

* * * * *